(12) United States Patent
Ohta et al.

(10) Patent No.: US 12,414,147 B2
(45) Date of Patent: Sep. 9, 2025

(54) MOBILE STATION, BASE STATION, COMMUNICATION SYSTEM, AND COMMUNICATION METHOD PERFORMED IN THE COMMUNICATION SYSTEM PERFORMING PRIORITY CONTROL

(71) Applicant: FUJITSU LIMITED, Kawasaki (JP)

(72) Inventors: Yoshiaki Ohta, Yokohama (JP); Yoshihiro Kawasaki, Kawasaki (JP); Takayoshi Ode, Yokohama (JP); Nobuhisa Aoki, Kawasaki (JP); Kenji Suda, Yokohama (JP); Tsuyoshi Shimomura, Yokohama (JP); Hongyang Chen, Kawasaki (JP); Huiting Cheng, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 17/129,156

(22) Filed: Dec. 21, 2020

(65) Prior Publication Data
US 2021/0112566 A1 Apr. 15, 2021

Related U.S. Application Data

(63) Continuation of application No. PCT/JP2018/024969, filed on Jun. 29, 2018.

(51) Int. Cl.
*H04W 72/56* (2023.01)
*H04W 28/02* (2009.01)
(Continued)

(52) U.S. Cl.
CPC ....... *H04W 72/56* (2023.01); *H04W 28/0268* (2013.01); *H04W 28/18* (2013.01);
(Continued)

(58) Field of Classification Search
CPC ............ H04W 72/10; H04W 28/0268; H04W 28/18; H04W 28/26; H04W 72/087; H04W 72/121; H04W 72/1242
See application file for complete search history.

(56) References Cited

U.S. PATENT DOCUMENTS 9,369,911 B2 * 6/2016 Terry ................. H04W 28/0268
2011/0170495 A1 * 7/2011 Earnshaw ............. H04L 5/0091
370/329
(Continued)

FOREIGN PATENT DOCUMENTS

CN 101902817 A 12/2010
JP 2011-142638 A 7/2011
(Continued)

OTHER PUBLICATIONS

3GPP TS 38.473 V15.1.1, "3rd Generation Partnership Project; Technical Specification Group Radio Access Network; NG-RAN; F1 application protocol (F1AP) (Release 15)", Apr. 2018.
(Continued)

*Primary Examiner* — Ivan O Latorre
(74) *Attorney, Agent, or Firm* — Myers Wolin, LLC

(57) ABSTRACT

A mobile station is a mobile station configured to transmit data to a base station by performing priority control, and includes a memory and a processor coupled to the memory and configured to be capable of transmitting a plurality of pieces of data having different requirements corresponding to a plurality of channel groups, and be capable of, when performing the priority control, applying a radio resource specified by the base station to a channel group specified by the base station out of the channel groups and controlling transmission of the data.

12 Claims, 8 Drawing Sheets

(51) Int. Cl.
  *H04W 28/18*   (2009.01)
  *H04W 28/26*   (2009.01)
  *H04W 72/121*  (2023.01)
  *H04W 72/543*  (2023.01)
(52) U.S. Cl.
  CPC ......... *H04W 28/26* (2013.01); *H04W 72/121* (2013.01); *H04W 72/543* (2023.01)

(56) References Cited

U.S. PATENT DOCUMENTS

| | | | |
|---|---|---|---|
| 2012/0057547 A1 | 3/2012 | Löhr et al. | |
| 2012/0076103 A1* | 3/2012 | Dai | H04L 5/0091 370/329 |
| 2012/0170524 A1* | 7/2012 | Ren | H04W 72/04 370/329 |
| 2012/0269154 A1* | 10/2012 | Wang | H04W 72/1242 370/329 |
| 2015/0071065 A1* | 3/2015 | Terry | H04W 28/24 370/230 |
| 2015/0173099 A1* | 6/2015 | Sun | H04L 1/1854 370/336 |
| 2015/0271809 A1* | 9/2015 | Kato | H04W 72/1263 370/329 |
| 2016/0157211 A1* | 6/2016 | Kato | H04W 72/04 455/450 |
| 2017/0257876 A1* | 9/2017 | Loehr | H04W 72/00 |
| 2018/0049189 A1* | 2/2018 | Hugl | H04L 5/0051 |
| 2018/0049218 A1* | 2/2018 | Hapsari | H04W 72/1242 |
| 2018/0124803 A1* | 5/2018 | Deng | H04W 72/12 |
| 2019/0014596 A1* | 1/2019 | Yang | H04W 72/21 |
| 2019/0053215 A1* | 2/2019 | Yu | H04B 7/15542 |
| 2019/0150176 A1* | 5/2019 | Pelletier | H04W 72/0453 370/329 |
| 2020/0084669 A1* | 3/2020 | Belleschi | H04W 72/1263 |
| 2020/0092937 A1* | 3/2020 | Yang | H04W 76/28 |
| 2020/0252945 A1* | 8/2020 | Jiang | H04W 72/1242 |
| 2020/0314888 A1* | 10/2020 | Kolding | H04W 72/1268 |
| 2020/0351915 A1* | 11/2020 | Zhao | H04W 72/10 |
| 2021/0007003 A1* | 1/2021 | Wu | H04W 28/0257 |
| 2021/0029720 A1* | 1/2021 | Wang | H04W 72/10 |

FOREIGN PATENT DOCUMENTS

| | | |
|---|---|---|
| JP | 2012-525030 A | 10/2012 |
| WO | 2014/054568 A1 | 4/2014 |
| WO | 2016/206005 A1 | 12/2016 |

OTHER PUBLICATIONS

3GPP TS 36.133 V15.1.0, 3rd Generation Partnership Project; Technical Specification Group Radio Access Network; Evolved Universal Terrestrial Radio Access (E-UTRA); Requirements for support of radio resource management (Release 15), Dec. 2017.
3GPP TS 36.300 V15.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Mar. 2018.
3GPP TS 36.211 V15.1.0,"3rd Generation Partnership Project; Technical Specification Group Radio Access Network; Evolved Universal Terrestrial Radio Access (E-UTRA); Physical channels and modulation (Release 15)", Mar. 2018.
3GPP TS 36.212 V15.1.0, "3rd Generation Partnership Project; Technical Specification Group Radio Access Network; Evolved Universal Terrestrial Radio Access (E-UTRA); Multiplexing and channel coding (Release 15)", Mar. 2018.
3GPP TS 36.213 V15.1.0, "3rd Generation Partnership Project; Technical Specification Group Radio Access Network; Evolved Universal Terrestrial Radio Access (E-UTRA); Physical layer procedures (Release 15)", Mar. 2018.
3GPP TS 36.214 V15.1.0, "3rd Generation Partnership Project; Technical Specification Group Radio Access Network; Evolved Universal Terrestrial Radio Access (E-UTRA); Physical layer;Measurements(Release 15)", Mar. 2018.
3GPP TS 36.321 V15.1.0, "3rd Generation Partnership Project; Technical Specification Group Radio Access Network; Evolved Universal Terrestrial Radio Access (E-UTRA); Medium Access Control (MAC) protocol specification (Release 15)", Mar. 2018.
3GPP TS 36.322 V15.0.1, "3rd Generation Partnership Project; Technical Specification Group Radio Access Network; Evolved Universal Terrestrial Radio Access (E-UTRA); Radio Link Control (RLC) protocol specification (Release 15)", Apr. 2018.
3GPP TS 36.323 V14.5.0, "3rd Generation Partnership Project; Technical Specification Group Radio Access Network; Evolved Universal Terrestrial Radio Access (E-UTRA); Packet Data Convergence Protocol (PDCP) specification (Release 14)", Dec. 2017.
3GPP TS 36.331 V15.1.0, "3rd Generation Partnership Project; Technical Specification Group Radio Access Network; Evolved Universal Terrestrial Radio Access (E-UTRA); Radio Resource Control (RRC); Protocol specification (Release 15)", Mar. 2018.
3GPP TS 36.413 V15.1.0, "3rd Generation Partnership Project; Technical Specification Group Radio Access Network; Evolved Universal Terrestrial Radio Access Network (E-Utran); S1 Application Protocol (S1AP) (Release 15)", Mar. 2018.
3GPP TS 36.423 V15.1.0, "3rd Generation Partnership Project; Technical Specification Group Radio Access Network; Evolved Universal Terrestrial Radio Access Network (E-UTRAN); X2 application protocol (X2AP) (Release 15)", Mar. 2018.
3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.
3GPP TR 38.912 V14.1.0, "3rd Generation Partnership Project; Technical Specification Group Radio Access Network; Study on New Radio (NR) access technology (Release 14)", Jun. 2017.
3GPP TR 38.913 V14.3.0, "3rd Generation Partnership Project; Technical Specification Group Radio Access Network; Study on Scenarios and Requirements for Next Generation Access Technologies; (Release 14)", Jun. 2017.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V14.3.1, "3rd Generation Partnership Project; Technical Specification Group Radio Access Network; Study on channel model for frequency spectrum above 6 GHz (Release 14)", Jul. 2017.
3GPP TS 38.300 V15.1.0, "3rd Generation Partnership Project; Technical Specification Group Radio Access Network; NR; NR and NG-RAN Overall Description; Stage 2 (Release 15)", Mar. 2018.
3GPP TS 37.340 V15.1.0, "3rd Generation Partnership Project; Technical Specification Group Radio Access Network; Evolved Universal Terrestrial Radio Access (E-UTRA) and NR; Multi-connectivity; Stage 2 (Release 15)", Mar. 2018.
3GPP TS 38.201 V15.0.0, "3rd Generation Partnership Project; Technical Specification Group Radio Access Network; NR; Physical layer; General description (Release 15)", Dec. 2017.
3GPP TS 38.202 V15.1.0, "3rd Generation Partnership Project; Technical Specification Group Radio Access Network; NR; Services provided by the physical layer (Release 15)", Mar. 2018.

(56) References Cited

OTHER PUBLICATIONS

3GPP TS 38.211 V15.1.0, "3rd Generation Partnership Project; Technical Specification Group Radio Access Network; NR; Physical channels and modulation (Release 15)", Mar. 2018.
3GPP TS 38.212 V15.1.0, "3rd Generation Partnership Project; Technical Specification Group Radio Access Network; NR; Multiplexing and channel coding (Release 15)", Mar. 2018.
3GPP TS 38.213 V15.1.0, "3rd Generation Partnership Project; Technical Specification Group Radio Access Network; NR; Physical layer procedures for control (Release 15)", Mar. 2018.
3GPP TS 38.214 V15.1.0, "3rd Generation Partnership Project; Technical Specification Group Radio Access Network; NR; Physical layer procedures for data (Release 15)", Mar. 2018.
3GPP TS 38.215 V15.1.0, "3rd Generation Partnership Project; Technical Specification Group Radio Access Network; NR; Physical layer measurements (Release 15)", Mar. 2018.
3GPP TS 38.321 V15.1.0, "3rd Generation Partnership Project; Technical Specification Group Radio Access Network; NR; Medium Access Control (MAC) protocol specification (Release 15)", Mar. 2018.
3GPP TS 38.322 V15.1.0, "3rd Generation Partnership Project; Technical Specification Group Radio Access Network; NR; Radio Link Control (RLC) protocol specification (Release 15)", Mar. 2018.
3GPP TS 38.323 V15.1.0, "3rd Generation Partnership Project; Technical Specification Group Radio Access Network; NR; Packet Data Convergence Protocol (PDCP) specification (Release 15)", Mar. 2018.
3GPP TS 37.324 V1.5.0, "3rd Generation Partnership Project; Technical Specification Group Radio Access Network; E-UTRA and NR; Service Data Adaptation Protocol (SDAP) specification (Release 15)", Apr. 2018.
3GPP TS 38.331 V15.1.0, "3rd Generation Partnership Project; Technical Specification Group Radio Access Network; NR; Radio Resource Control (RRC) protocol specification (Release 15)", Mar. 2018.
3GPP TS 38.401 V15.1.0, "3rd Generation Partnership Project; Technical Specification Group Radio Access Network; NG-RAN; Architecture description (Release 15)", Mar. 2018.
3GPP TS 38.410 V0.9.0, "3rd Generation Partnership Project; Technical Specification Group Radio Access Network; NG-RAN; NG general aspect and principles (Release 15)", Apr. 2018.
3GPP TS 38.413 V0.8.0, "3rd Generation Partnership Project; Technical Specification Group Radio Access Network; NG-RAN; NG Application Protocol (NGAP) (Release 15)", Apr. 2018.
3GPP TS 38.420 V0.8.0, "3rd Generation Partnership Project; Technical Specification Group Radio Access Network; NG-RAN; Xn general aspects and principles (Release 15)", Apr. 2018.
3GPP TS 38.423 V0.8.0, "3rd Generation Partnership Project; Technical Specification Group Radio Access Network; NG-RAN; Xn application protocol (XnAP) (Release 15)", Apr. 2018.
3GPP TS 38.470 V15.1.0, "3rd Generation Partnership Project; Technical Specification Group Radio Access Network; NG-RAN; F1 general aspects and principles (Release 15)", Mar. 2018.
International Search Report and Written Opinion of the International Searching Authority issued by the Japan Patent Office for corresponding International Patent Application No. PCT/JP2018/024969, mailed on Sep. 11, 2018, with an English translation.
First Notification of Office Action and Search Report issued by the China National Intellectual Property Administration for corresponding Chinese Patent Application No. 201880095016.1, mailed on Apr. 21, 2023, with an English translation.
Interdigital Communications, "Logical Channel Prioritization with Multiple Numerologies for NR", Agenda Item: 10.2.1.4, 3GPP TSG-RAN WG2 Meeting #97, R2-1701185 (Update to R2-1700236), Athens, Greece, Feb. 13-17, 2017.

\* cited by examiner

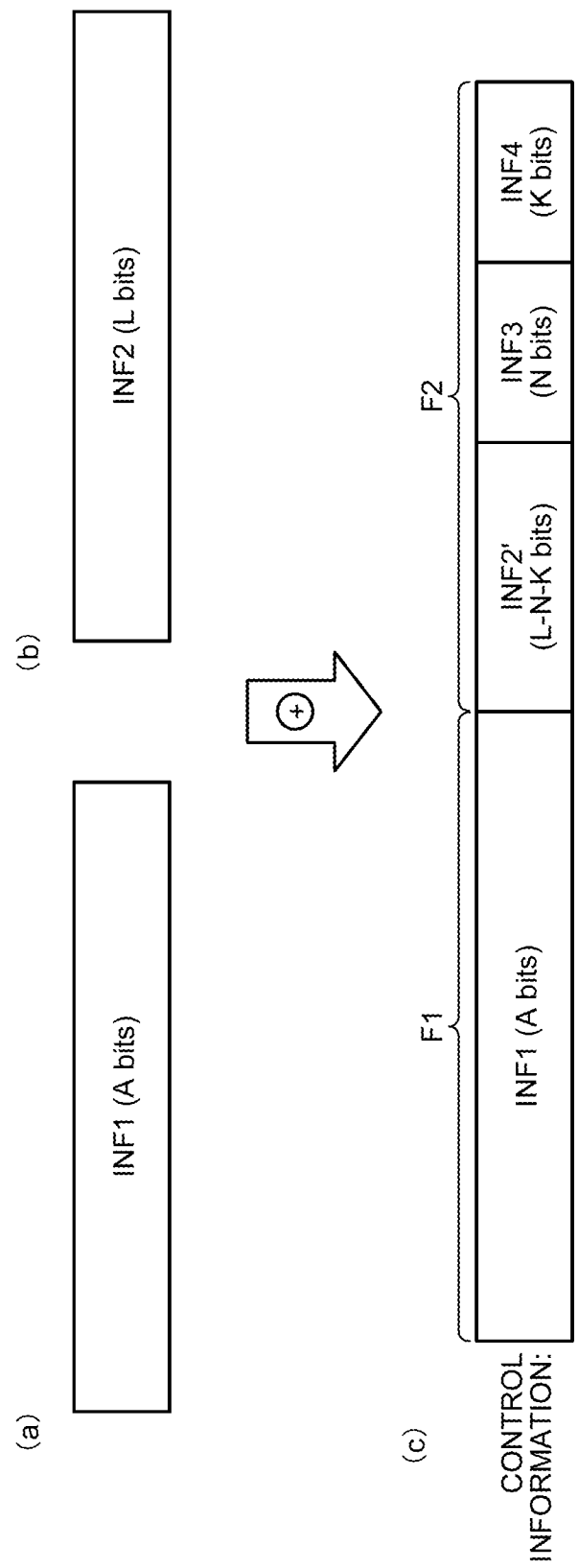

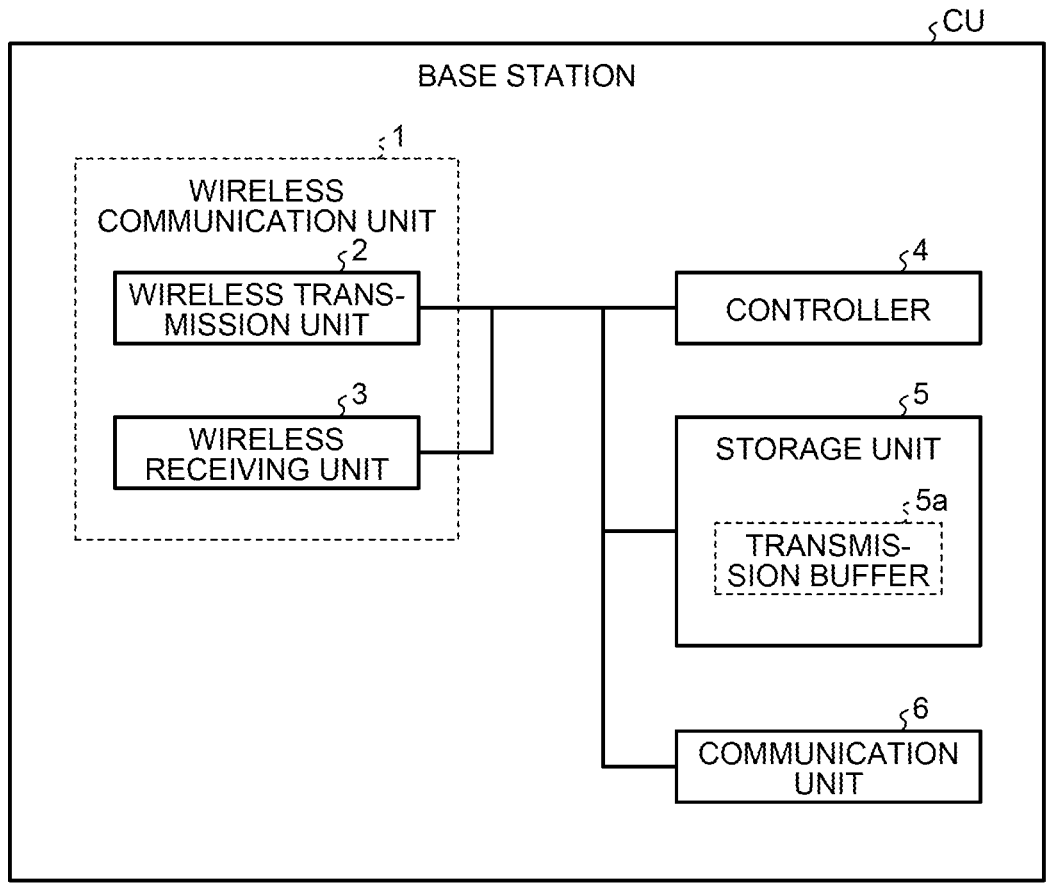

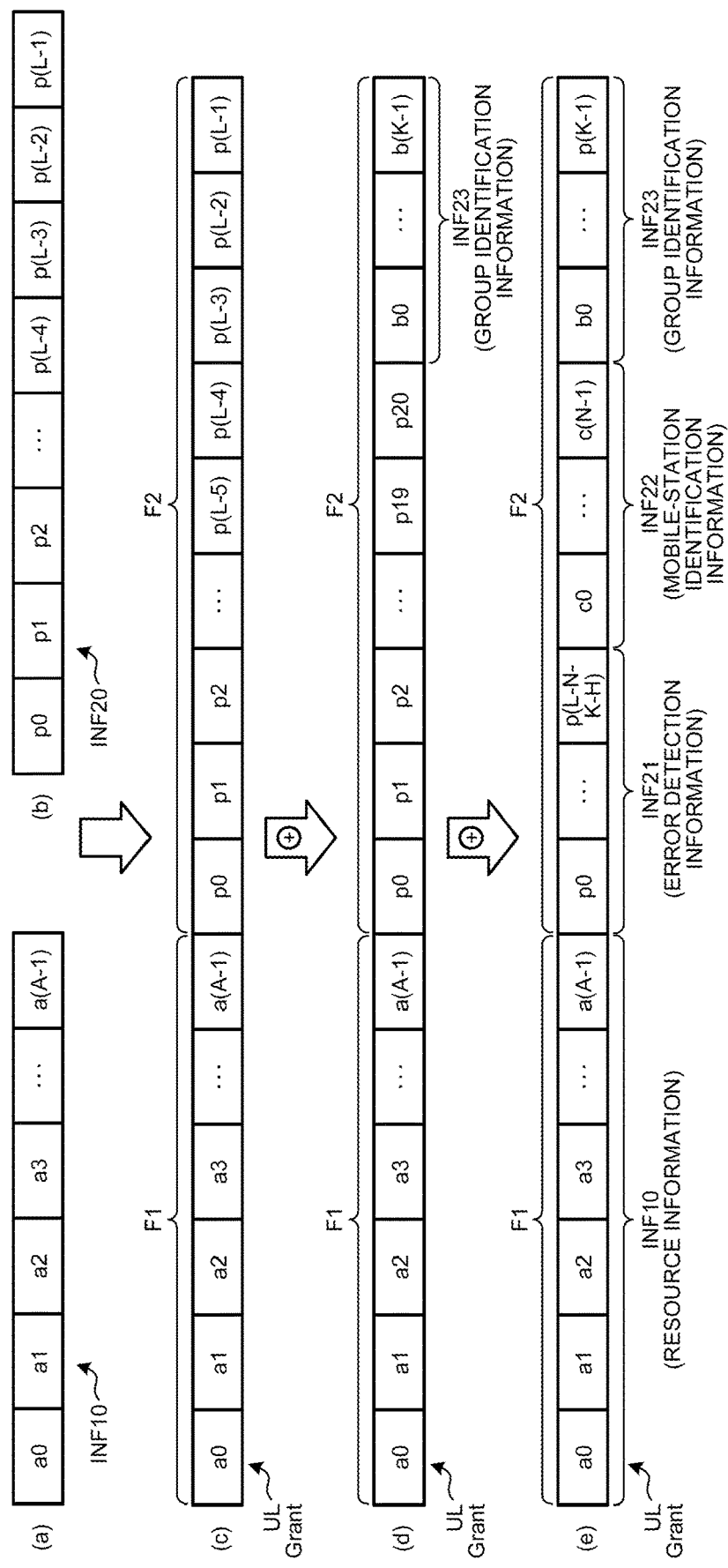

MOBILE STATION, BASE STATION, COMMUNICATION SYSTEM, AND COMMUNICATION METHOD PERFORMED IN THE COMMUNICATION SYSTEM PERFORMING PRIORITY CONTROL

CROSS-REFERENCE TO RELATED APPLICATION

This application is a continuation of International Application No. PCT/JP2018/024969, filed on Jun. 29, 2018, the entire contents of which are incorporated herein by reference.

FIELD

The embodiments discussed herein are related to a mobile station, a base station, a communication system, and a communication method.

BACKGROUND

In the current network, the traffic of mobile terminals (smartphones and feature phones) occupies most of network resources. In addition, the traffic used by mobile terminals tends to increase in the future.

Meanwhile, along with the deployment of IoT (Internet of Things) services (for example, monitoring systems for traffic systems, smart meters, devices, or the like), it is desired to cope with services having diverse requirements has been desired. Thus, in the communication standard of the 5th generation mobile communication (5G or NR (New Radio)), in addition to the standard technologies of the 4G (4th generation mobile communication), technologies that further achieve higher data rates, larger capacity, and lower latency have been desired. As for the 5th generation communication standards, technical studies have been underway in the working groups of 3GPP (for example, TSG-RAN WG1, TSG-RAN WG2, and the like).

As in the foregoing, in order to cope with a wide variety of services, the 5G assumes many use cases that are classified into eMBB (Enhanced Mobile BroadBand), Massive MTC (Machine Type Communications), and URLLC (Ultra-Reliable and Low Latency Communication).

In priority control of logical channels (LCP (Logical Channel Prioritization)), the control information on radio resources (for example, UL Grant) is transmitted from a base station to a mobile station. The mobile station, upon receiving the control information on radio resources, allocates the radio resources specified in the control information to each logical channel and transmits data of each logical channel to the base station by using the allocated radio resources. Related art examples are described in Japanese Patent Application Laid-open No. 2012-525030, and in non-patent literature of 3GPP TS36.133 V15.1.0, 3GPP TS36.300 V15.1.0, 3GPP TS36.211 V15.1.0, 3GPP TS36.212 V15.1.0, 3GPP TS36.213 V15.1.0, 3GPP TS36.214•V15.1.0, 3GPP TS36.321 V15.1.0, 3GPP TS36.322 V15.0.1, 3GPP TS36.323 V14.5.0, 3GPP TS36.331 V15.1.0, 3GPP TS36.413 V15.1.0, 3GPP TS36.423 V15.1.0, 3GPP TS36.425 V15.1.0, 3GPP TR38.912 V14.1.0, 3GPP TR38.913 V14.3.0, 3GPP TR38.801 V14.0.0, 3GPP TR38.802 V14.2.0, 3GPP TR38.803 V14.2.0, 3GPP TR38.804 V14.0.0, 3GPP TR38.900 V14.3.1, 3GPP TS38.300 V15.1.0, 3GPP TS37.340 V15.1.0, 3GPP TS38.201 V15.0.0, 3GPP TS38.202 V15.1.0, 3GPP TS38.211 V15.1.0, 3GPP TS38.212 V15.1.0, 3GPP TS38.213 V15.1.0, 3GPP TS38.214 V15.1.0, 3GPP TS38.215 V15.1.0, 3GPP TS38.321 V15.1.0, 3GPP TS38.322 V15.1.0, 3GPP TS38.323 V15.1.0, 3GPP TS37.324 V1.5.0, 3GPP TS38.331 V15.1.0, 3GPP TS38.401 V15.1.0, 3GPP TS38.410 V0.9.0, 3GPP TS38.413 V0.8.0, 3GPP TS38.420 V0.8.0, 3GPP TS38.423 V0.8.0, 3GPP TS38.470 V15.1.0, and 3GPP TS38.473 V15.1.1.

However, when the allocation of radio resources based on the control information on radio resources is not performed properly on a plurality of pieces of data having different requirements (for example, when radio resources are collectively allocated to data of different QoS), the radio resources between the base station and the mobile station may fail to be used efficiently.

SUMMARY

According to an aspect of an embodiment, a mobile station is a mobile station configured to transmit data to a base station by performing priority control, and includes a memory; and a processor coupled to the memory and configured to: be capable of transmitting a plurality of pieces of data having different requirements corresponding to a plurality of channel groups; and be capable of, when performing the priority control, applying a radio resource specified by the base station to a channel group specified by the base station out of the channel groups and controlling transmission of the data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating mask processing of control information in the first embodiment;

FIG. 3 is a diagram illustrating a configuration of a base station according to a second embodiment;

FIG. 4 is a diagram illustrating mapping information on logical channel groups in the second embodiment;

FIG. 5 is a diagram illustrating mask processing of control information (UL Grant) in the second embodiment;

DESCRIPTION OF EMBODIMENTS

Preferred embodiments of the present invention will be explained with reference to accompanying drawings. The disclosed technology, however, is not intended to be limited by the embodiments. In the embodiments, constituents hav-

[a] First Embodiment

Figure 1:
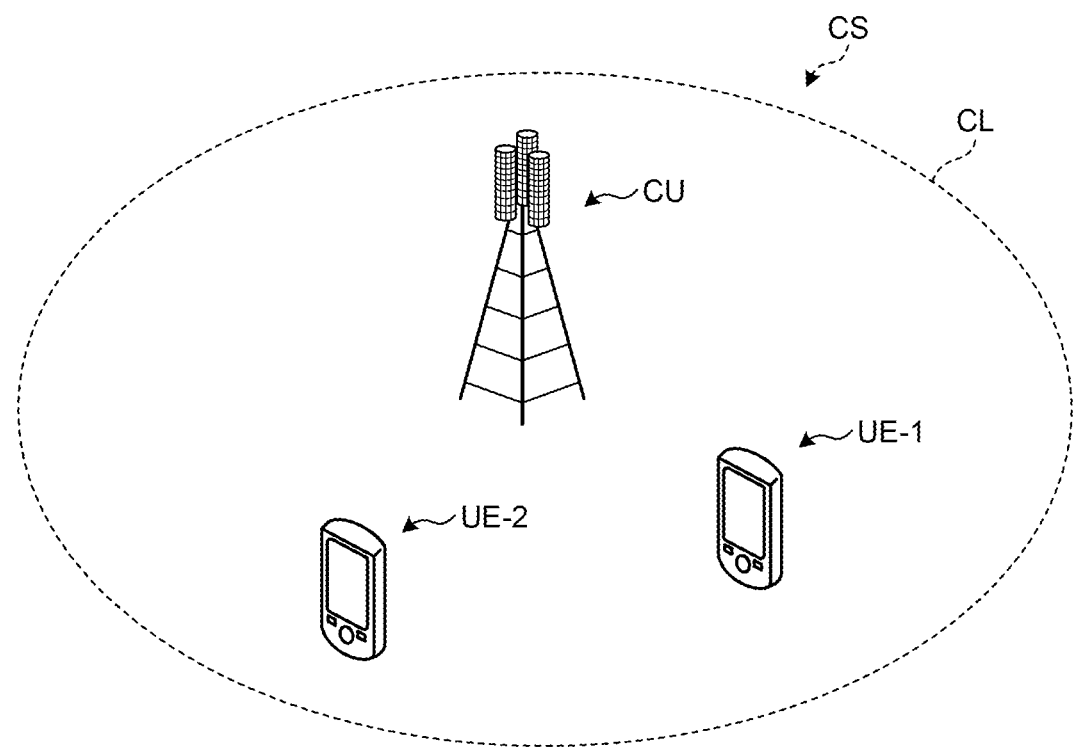
FIG. 1 is a diagram illustrating a configuration of a communication system according to a first embodiment.

A communication system CS using a wireless access network is configured as illustrated in FIG. 1, for example. FIG. 1 is a diagram illustrating the configuration of the communication system CS. In the communication system CS, a base station CU can transmit information to a plurality of mobile stations UE-1 and UE-2 residing in a cell CL via wireless links and receive information from the mobile stations UE-1 and UE-2 via the wireless links. In addition, the information can be transmitted and received between the mobile stations UE-1 and UE-2 via wireless links. In the following description, when the mobile stations UE-1 and UE-2 are not distinguished from each other, they are referred to simply as mobile stations UE.

In an uplink (UL) that is a wireless link from the mobile station UE to the base station CU, an uplink physical channel is used. In a downlink (DL) that is a wireless link from the base station CU to the mobile station UE, a downlink physical channel is used. In a side-link that is a wireless link between the mobile stations UE-1 and UE-2, a side-link physical channel is used. In addition, the base station CU or the mobile station UE can logically construct a plurality of logical channels in each physical channel. The logical channels can be constructed for a plurality of types of data different from one another.

A certain downlink physical channel can be used to transmit control information from the base station CU to the mobile station UE. At this time, the base station CU can perform masking processing on the control information as illustrated in FIG. 2. FIG. 2 is a diagram illustrating the masking processing of the control information.

Specifically, the base station CU prepares information INF1 and information INF2 that are to be sent to the mobile station UE. It is assumed that the information INF1 is the information in A bits (A is an integer of two or more) as illustrated in FIG. 2(a) and that the information INF2 is the information in L bits (L is an integer of two or more) as illustrated in FIG. 2(b). The base station CU provides, when configuring the control information, a field F1 of A-bit length for the information INF1 and a field F2 of L-bit length for the information INF2, as illustrated in FIG. 2(c). The base station CU can configure the control information by storing the information INF1 in the field F1 and storing the information INF2 in the field F2.

At this time, when there are, out of L bits of the information INF2, N+K bits (N and K are each an integer of one or more that satisfies N+K<L) of an unused bit region and/or of a bit region that can be omitted, the base station CU masks (scrambles) the information INF2 by information INF3 in N bits and information INF4 in K bits and considers the content that should be included in the information INF2 as information INF2'. That is, the information INF2 is masked (scrambled) by the two types of information of INF3 and INF4 of two types Then, by assuming the information INF3 as the information that is grasped by the mobile station UE-1 but not by the other mobile station UE-2 and assuming the information INF4 as the information to be notified by combining with other information (for example, the information INF1 or the information INF3), the base station CU can selectively transmit the control information to the specific mobile station UE-1 and selectively notify the specific mobile station UE-1 of the combination of the information INF4 and the other information.

In FIG. 2, a case of masking (scrambling) the information INF2 from the least bits by the information INF4 and the information INF3 is illustrated, but the information INF2 may be masked (scrambled) from the significant bits by the information INF4 and the information INF3. That is, in the field F2, the information INF4, the information INF3, and the information INF2' may be stored in the foregoing order from the significant bits, or the information INF3, the information INF4, and the information INF2' may be stored in the foregoing order from the upper bits. Alternatively, the information INF2 may be masked (scrambled) from an intermediate bit by the information INF4 and the information INF3. That is, in the field F2, when the information INF2' is divided into information INF2a and information INF2b, the information INF2a, the information INF4, the information INF3, and the information INF2b may be stored in the foregoing order from the significant bits, or the information INF2a, the information INF3, the information INF4, and the information INF2b may be stored in the foregoing order from the significant bits.

Application examples of the first embodiment will be described. For example, when a certain downlink physical channel is PDCCH, the masking processing of the control information illustrated in FIG. 2 is used for the transmission of data. For example, it is applied to the transmission of the following data.

Transmission of Data According to QoS (Priority Control)

Determination of useage method of the relevant certain downlink physical channel by extending masking (determination of what purpose it is used for)

Extension of an identifier of UE (for example, when the identifier of UE is INF4 (INF3), INF4+INF3 (INF3+INF4) is defined as an extension identifier) when performing masking by the identifier of UE

[b] Second Embodiment

A second embodiment will be described. The portions the same as those of the first embodiment will be described by using the same reference signs. For example, when a certain downlink physical channel is PDCCH (Physical Downlink Control Channel), the mask processing illustrated in FIG. 2 can be applied to the priority control of logical channels (LCP: Logical Channel Prioritization).

In the priority control of logical channels, the control information on radio resources (for example, UL Grant) is transmitted from the base station CU to the mobile station UE. The mobile station UE, upon receiving the control information on radio resources, allocates the radio resources specified in the control information to each logical channel and transmits data of each logical channel to the base station CU by using the allocated radio resources. At this time, when the allocation of radio resources based on the control information on radio resources is not performed properly on a plurality of data having different requirements (for example, when radio resources are collectively allocated to data of different QoS), the radio resources between the base station and the mobile station may fail to be used efficiently.

Thus, the second embodiment aims, by allocating the radio resources not in units of mobile stations but in units of logical channel groups in which logical channels are grouped for each QoS, so as to make the use of radio resources between the base station and the mobile station efficient.

Specifically, the base station CU can be configured as illustrated in FIG. 3. FIG. 3 is a diagram illustrating the configuration of the base station CU. The base station CU includes a wireless communication unit 1, a controller 4, a storage unit 5, and a communication unit 6. The wireless communication unit 1 includes a wireless transmission unit 2 and a wireless receiving unit 3. The storage unit 5 includes a transmission buffer 5a. The communication unit 6 is an interface for a network.

The controller 4 performs, prior to the priority control of logical channels, grouping on a plurality of logical channels constructed in an uplink physical channel, generates mapping information 51 about logical channel groups, and stores it in the storage unit 5 and transmits it to the mobile station UE via the wireless transmission unit 2. The mapping information 51 about logical channel groups is the information in which channel identification information is mapped to group identification information. The channel identification information is the information that identifies the logical channel and can be LCID. The group identification information is the information that identifies the logical channel group and can be LCGID.

For example, the mapping information 51 about logical channel groups has a data structure as illustrated in FIG. 4. FIG. 4 is a diagram illustrating the mapping information about logical channel groups. A plurality of logical channels LCH_1, LCH_2, LCH_3, and LCH_n illustrated in FIG. 4 can be constructed for a plurality of types of data different from one another. The logical channels LCH_1, LCH_2, and LCH_3 can be constructed for the data for which a service quality identifier is QoS1 (for example, Web data, FTP data, backup data, and the like). The logical channel LCH_n can be constructed for the data for which the service quality identifier is QoS2 (>QoS1) (for example, voice data (VoIP)).

Because the service quality identifier corresponding to the logical channels LCH_1, LCH_2, and LCH_3 differs from that of the logical channel LCH_n, the base station CU maps logical channel groups different from each other. A logical channel group LCG_1 is mapped to each of the logical channels LCH_1, LCH_2, and LCH_3 and a logical channel group LCG_2 is mapped to the logical channel LCH_n. That is, the logical channel groups correspond to the service quality identifiers different from one another.

Quality of Service (QoS) is a metric that can be guaranteed to avoid congestion in communication services in the communication system CS. The Quality of Service (QoS) can be specified by the service quality identifier. The service quality identifier can include information on the priority and the like in order to perform priority control in a certain unit (for example, a flow unit) on data. For example, a service quality identifier QI can include QCI (QoS Class Identifier), QFI (QoS Flow Identifier), FPI (Flow Priority Identifier), and the like. The service quality identifier can include a value indicating the order of priority.

The controller 4 illustrated in FIG. 3 can, when mapping information on the logical channel groups is generated, generate correspondence information in which the group identification information and the service quality identifiers are associated with a plurality of logical channel groups and store the generated correspondence information in the storage unit 5. This enables the base station CU to manage the service quality identifier corresponding to each of the logical channel groups. In the case of FIG. 4, because the service quality identifier QoS2 corresponding to the logical channel group LCG_2 is greater than the service quality identifier QoS1 corresponding to the logical channel group LCG_1, the base station CU can grasp that the logical channel group LCG_2 corresponds to the data of higher priority relative to the logical channel group LCG_1.

Then, the controller 4 can, in the priority control of logical channels, perform masking processing of the control information (UL Grant) illustrated in FIG. 5. FIG. 5 is a diagram illustrating the mask processing of the control information (UL Grant).

The order of INF21, INF22, and INF23 illustrated in FIG. 5 is one example and may be in any desired order. In FIG. 5, although the case of masking (scrambling) information INF20 from the least bits by the information INF23 and the information INF22 is illustrated, the information INF20 may be masked (scrambled) from the significant bits by the information INF23 and the information INF22. That is, in the field F2, the information INF23, the information INF22, and the information INF21 may be stored in the foregoing order from the significant bits, or the information INF22, the information INF23, and the information INF21 may be stored in the foregoing order from the significant bits. Alternatively, the information INF20 may be masked (scrambled) from an intermediate bit by the information INF23 and the information INF22. That is, in the field F2, when the information INF21 is divided into information INF21a and information INF21b, the information INF21a, the information INF23, the information INF22, and the information INF21b may be stored in the foregoing order from the significant bits, or the information INF21a, the information INF22, the information INF23, and the information INF21b may be stored in the foregoing order from the significant bits.

Furthermore, the controller 4 illustrated in FIG. 3 can perform early decoding (early termination decoding) by using INF21 (error detection information) illustrated in FIG. 5. If the early decoding can be performed on the decoding of the fields F1 and F2 by using INF21 (error detection information), the decoding of the fields F1 and F2 can be terminated halfway (for example, in a stage where 70% of the decoding is completed). If the number of bits of INF21 (error detection information) can be made longer than a certain number of bits (for example, three bits), the possibility (frequency) of performing the early decoding on the decoding of the fields F1 and F2 can be increased. If the early decoding can be performed on the decoding of the fields F1 and F2, the decoding processing time of the fields F1 and F2 can be shortened and the power consumption needed for the decoding processing of the fields F1 and F2 can be reduced.

The base station CU prepares information INF10 and information INF20 that are to be sent to the mobile station UE. It is assumed that the information INF10 is the information in A bits (A is an integer of two or more) as illustrated in FIG. 5(a) and includes bits a0, a1, a2, a3, . . . , and a(A−1), and that the information INF20 is the information in L bits (L is an integer of two or more) as illustrated in FIG. 5(b) and includes bits p0, p1, p2, p3, . . . , and p(L−1).

The information INF10 can be resource information that specifies radio resources available on a frequency-time domain. The information INF20 can be error detection information for performing error detection. For example, when the information INF20 is a parity bit string of CRC (Cyclic Redundancy Check), L=24 (bits) can be set.

The base station CU provides, when configuring the control information (UL Grant), the field F1 of A-bit length for the information INF10 and the field F2 of L-bit length for the information INF20, as illustrated in FIG. 5(c). The base station CU can configure the control information (UL Grant)

by storing the information INF10 in the field F1 and storing the information INF20 in the field F2.

At this time, when there are, out of L bits of the information INF20, N+K bits (N and K are each an integer of one or more that satisfies N+K<L) of an unused bit region and/or of a bit region that can be omitted, the base station CU masks (scrambles) the information INF20 by the information INF23 in K bits as illustrated in FIG. 5(d), masks (scrambles) the information INF20 by the information INF22 in N bits as illustrated in FIG. 5(e), and assumes the content to be included in the information INF20 as the information INF21. That is, the information INF20 is masked (scrambled) by the two types of information INF22 and INF23.

The information INF22 can be mobile-station identification information that identifies the destination mobile station to which the base station CU is to send the control information (UL Grant). For example, when the information INF22 is C-RNTI (Radio Network Temporary ID), N=16 (bits) can be set.

The information INF23 can be group identification information that identifies the logical channel group. For example, when the information INF23 is LCGID, K=3 (bits) can be set.

The number of bits of the information INF21 may vary depending on the values of L, N, and K, and when L=24, N=16, and K=3, for example, the number of bits of the information INF21 can be L−N−K=5 (bits). The values of L, N, and K are not limited to this example, and can be changed in various ways according to the specifications needed. The number of bits of the information INF21 may be made smaller than the number of bits of L−N−K, and there may be a region other than INF21, INF22, and INF23 in the field F2.

As illustrated in FIG. 5(e), by considering the information INF22 as the information that is grasped by the mobile station UE-1 but not by the other mobile station UE-2 and considering the information INF23 as the information to be notified by combining with the information INF10, the base station CU can selectively transmit the control information (UL Grant) to the specific mobile station UE-1 and selectively notify the specific mobile station UE-1 of the combination of the information INF23 (group identification information) and the information INF10 (resource information).

This enables the base station CU to control the allocation of radio resources by the control information on radio resources in the mobile station UE not in units of mobile station UE but in units of logical channel groups. As a result, the base station CU can perform control so that, in consideration of the service quality identifier corresponding to each logical channel group, the transmission of a plurality of pieces of data corresponding to a plurality of logical channel groups to the base station CU is appropriately performed in the mobile station UE.

Figure 6:
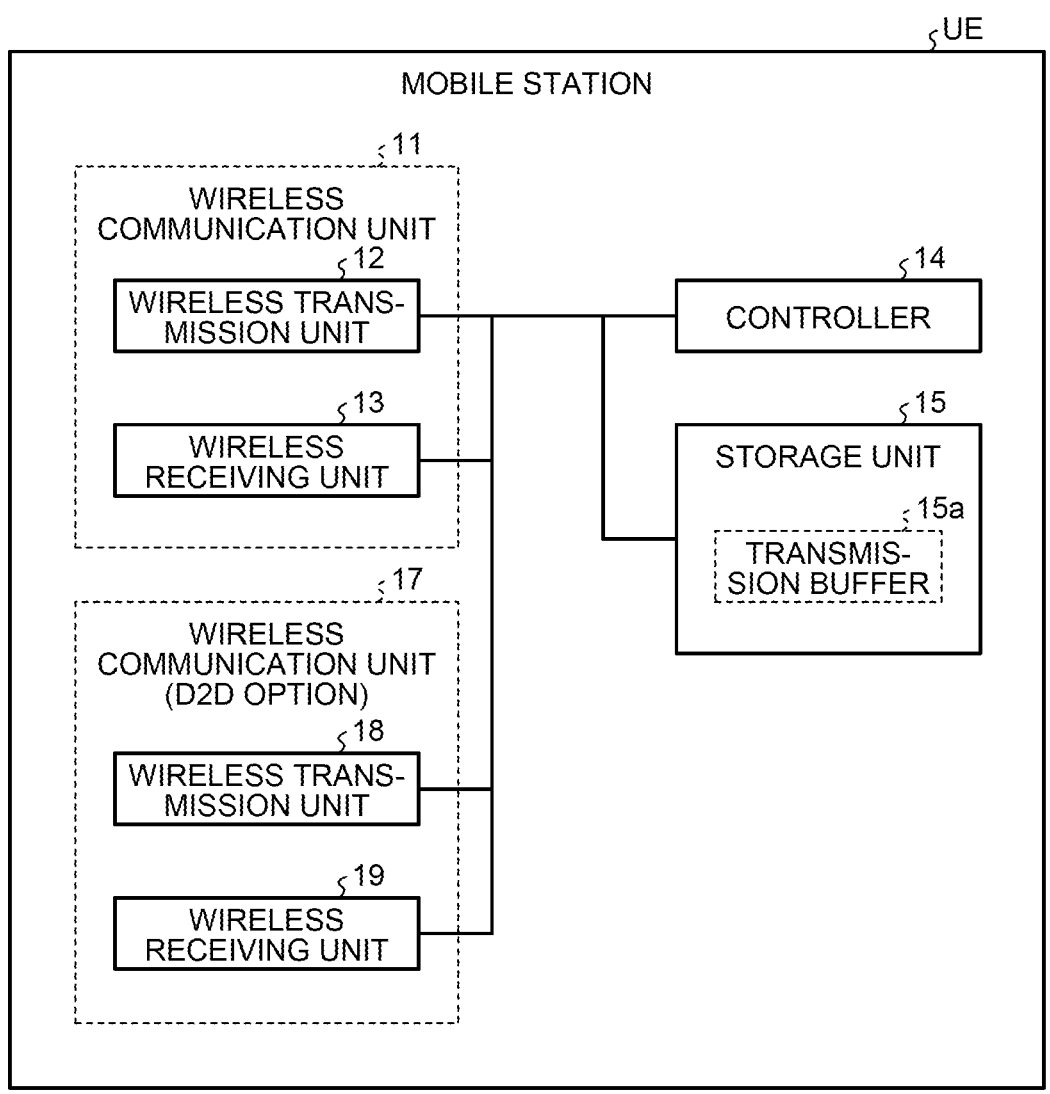
FIG. 6 is a diagram illustrating a configuration of a mobile station in the second embodiment.

The mobile station UE can be configured as illustrated in FIG. 6. FIG. 6 is a diagram illustrating the configuration of the mobile station UE. The mobile station UE includes a wireless communication unit 11, a controller 14, a storage unit 15, and a wireless communication unit 17. The wireless communication unit 11 is a wireless interface used in communications with the base station CU and includes a wireless transmission unit 12 and a wireless receiving unit 13. The wireless communication unit 17 is a wireless interface for side-link (D2D link) and includes a wireless transmission unit 18 and a wireless receiving unit 19 The storage unit 15 includes a transmission buffer 15a.

Prior to the priority control of logical channels, when the wireless receiving unit 13 receives the mapping information 51 from the base station CU, the controller 14 stores the mapping information 51 in the storage unit 15.

In the priority control of logical channels, when the wireless receiving unit 13 receives the control information (UL Grant) from the base station CU, the controller 14 applies the radio resources specified by the base station CU to the logical channel group specified by the base station out of a plurality of logical channel groups and controls the transmission of a plurality of data corresponding to the logical channel groups.

The wireless receiving unit 13 can receive first control information from the base station CU. The first control information includes the resource information that specifies a first radio resource and the group identification information that specifies a first logical channel group. The controller 14, according to the first control information, allocates the first radio resource to the first logical channel group and controls the transmission of data corresponding to the first logical channel group.

The wireless receiving unit 13 can receive second control information from the base station CU. The second control information includes the resource information that specifies a second radio resource and the group identification information that specifies a second logical channel group. The controller 14, according to the second control information, allocates the second radio resource to the second logical channel group and controls the transmission of the data corresponding to the second logical channel group.

Figure 7:
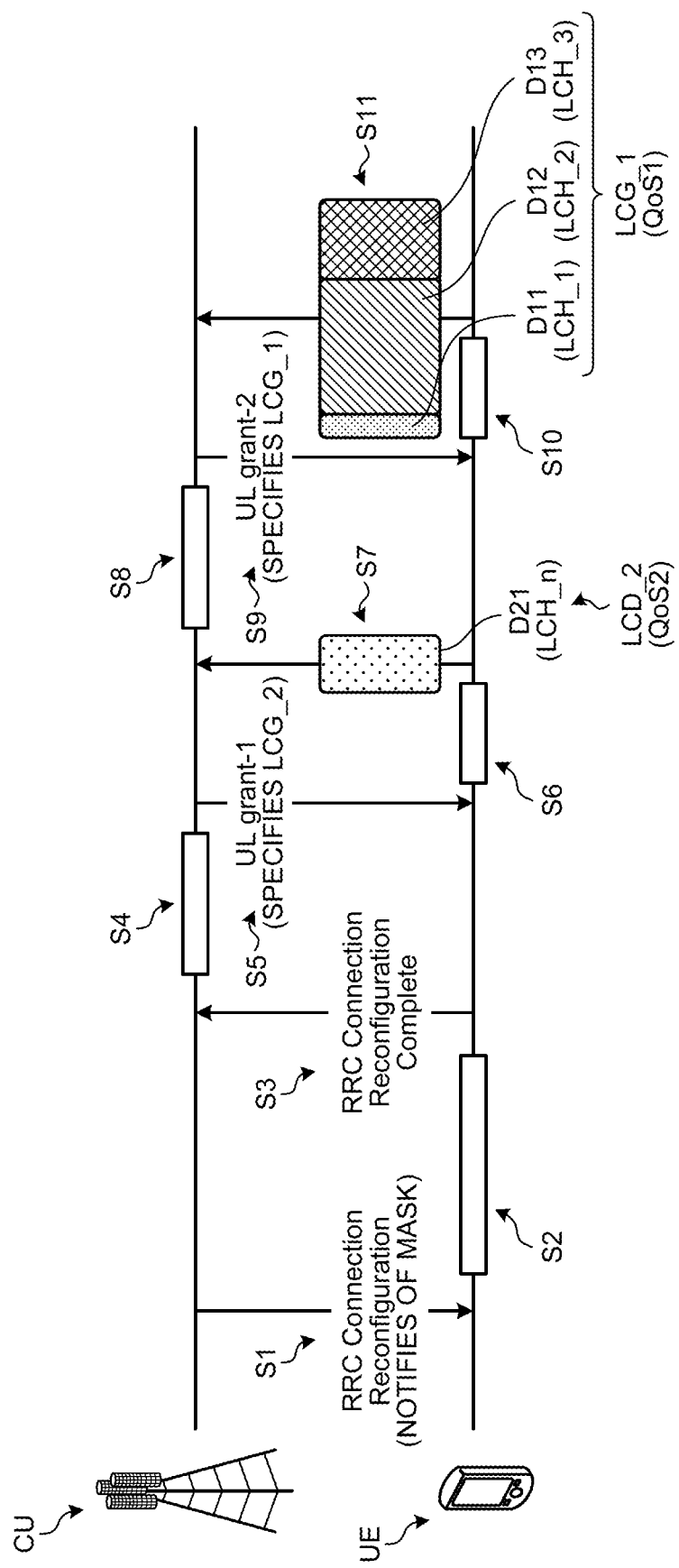
FIG. 7 is a sequence diagram illustrating operation of a communication system in the second embodiment.
Figure 8:
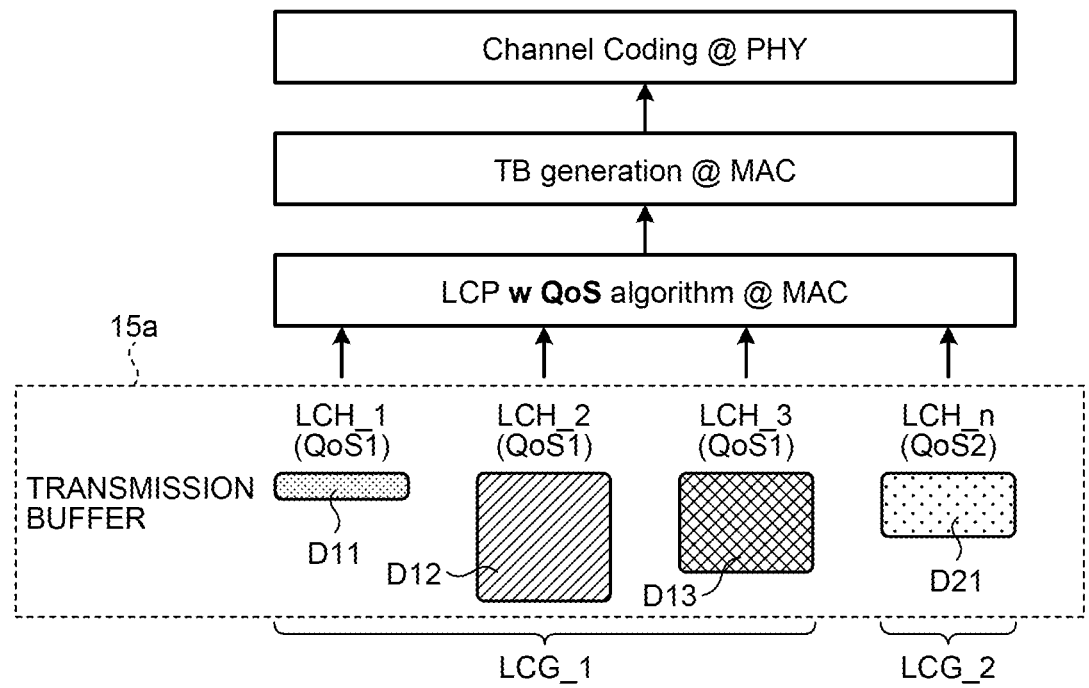
FIG. 8 is a diagram illustrating control of a physical layer in the second embodiment.

More specifically, the priority control of logical channels can be performed as illustrated in FIG. 7 and FIG. 8. FIG. 7 is a sequence diagram illustrating the operation of the communication system CS. FIG. 8 is a diagram illustrating the data corresponding to each logical channel group.

The base station CU generates a bearer setting request "RRC Connection Reconfiguration" including notification of bit position at which the mask processing in the control information (UL Grant) is performed and transmits it to the mobile station UE (S1).

The mobile station UE, when the bearer setting request "RRC Connection Reconfiguration" including the notification of bit position at which the mask processing is performed is received, according to the bearer setting request, stores the information concerning the bit position at which the mask processing is performed in the storage unit 15 (S2). Along with that, the mobile station UE generates bearer-setting result notification "RRC Connection Reconfiguration Complete" and replies to the base station CU (S3).

The base station CU, by receiving the bearer-setting result notification "Connection Reconfiguration Complete", recognizes that the mobile station UE has completed preparations for the masking processing. Along with that, the base station CU generates control information "UL Grant-1" including the resource information that specifies the first radio resource and the group identification information that specifies the logical channel group LCG_2 (S4), and transmits the control information "UL Grant-1" to the mobile station UE (S5).

The mobile station UE, upon receiving the control information "UL Grant-1", checks the field F2 in the control information "UL Grant-1". The mobile station UE can descramble the field F2 with mobile-station identification information (C-RNTI) of its own and, if there are no error detection errors (CRC errors), the mobile station UE replies an ACK to the base station CU and allocates the first radio resource specified by the information (resource information)

INF10 in the field F1 to the logical channel group LCG_2 specified by the information (group identification information) INF23 in the field F2 (S6).

In response to this, the control of a physical layer as illustrated in FIG. 8 can be performed. The mobile station UE generates, if data D21 is stored in the region secured for the logical channel LCH_n belonging to the logical channel group LCG_2 in the transmission buffer 15a, a transport block (TB) corresponding to the first radio resource in accordance with the LCP algorithm. The mobile station UE maps the logical channel LCH_n to the generated transport block (channel coding) and passes the data D21 of the logical channel LCH_n to the transport block. As a result, as illustrated in FIG. 7, the mobile station UE transmits the data D21 to the base station CU (S7).

The base station CU identifies, upon receiving the data D21 corresponding to the logical channel group LCG_2, the logical channel group LCG_1 as the logical channel group of the next highest priority after the logical channel group LCG_2. Then, the base station CU generates control information "UL Grant-2" including the resource information that specifies the second radio resource and the group identification information that specifies the logical channel group LCG_1 (S8), and transmits the control information "UL Grant-2" to the mobile station UE (S9).

The mobile station UE, upon receiving the control information "UL Grant-2", checks the field F2 in the control information "UL Grant-2". The mobile station UE can descramble the field F2 with the mobile-station identification information (C-RNTI) of its own and, if there are no error detection errors (CRC errors), the mobile station UE replies an ACK to the base station CU and allocates the second radio resource specified by the information (resource information) INF10 in the field F1 to the logical channel group LCG_1 specified by the information (group identification information) INF23 in the field F2 (S10).

In response to this, the control of the physical layer as illustrated in FIG. 8 can be performed. The mobile station UE generates, if data D11, D12, and D13 are stored in the regions secured for the logical channels LCH_1, LCH_2, and LCH_3, respectively, belonging to the logical channel group LCG_1 in the transmission buffer 15a, the transport block (TB) corresponding to the second radio resource in accordance with the LCP algorithm. The mobile station UE maps the logical channels LCH_1, LCH_2, and LCH_3 to the generated transport block (channel coding) and passes the data D11, D12, and D13 of the logical channels LCH_1, LCH_2, and LCH_3 to the transport block. As a result, as illustrated in FIG. 7, the mobile station UE transmits the data D11, D12, and D13 to the base station CU (S11).

As illustrated in FIG. 7, as the masking processing of the second embodiment is applied to the priority control of logical channels, the transmission of a plurality of data corresponding to a plurality of logical channel groups from the mobile station UE to the base station CU can be performed appropriately in a proper order according to the service quality identifiers QoS2 and QoS1.

In the second embodiment, the case where the masking processing of the second embodiment is applied to the priority control of logical channels in the uplink has been exemplified, but the same effect can be achieved even when the masking processing of the second embodiment is applied to the priority control of logical channels in the downlink. For example, in the base station CU, when performing the priority control, the controller 4 selects a logical channel group out of a plurality of logical channel groups and applies the radio resources to the selected logical channel group. As a result, the controller 4 controls the transmission of a plurality of data corresponding to the logical channel groups. For example, the priority control of logical channels can be represented, in the sequence diagram illustrated in FIG. 7, by omitting S1 to S3, S5, and S9 and changing the arrows of S7 and S11 to the opposite direction. Furthermore, by replacing the transmission buffer 15a illustrated in FIG. 8 with the transmission buffer 5a (see FIG. 3), the control of the physical layer can be represented.

[c] Third Embodiment

A third embodiment will be described. The portions the same as those of the first embodiment and the second embodiment will be described by using the same reference signs. For example, when a certain downlink physical channel is PDCCH (Physical Downlink Control Channel), the mask processing of control information illustrated in FIG. 2 can be applied to the identification of a plurality of mobile stations UE-1 and UE-2 in the downlink/uplink and side-link.

For example, a case is considered where the PDCCH transmission of the downlink from the base station CU to the mobile station UE-1 is performed by the masking processing of the first mobile-station identification information "UL SPS V-RNTI"; and in the side-link between the mobile station UE-1 and the mobile station UE-2, dynamic scheduling is performed, and in the masking processing of the second mobile-station identification information "SL-V-RNTI", periodic scheduling is performed, each of which scheduling is performed with the masking processing of the third mobile-station identification information "SL SPS V-RNTI". In this case, because there are mixed three types of mobile-station identification information (RNTI), erroneous detection of the mobile-station identification information (RNTI) may occur in the base station CU.

Thus, in the second application example, the identification of a plurality of mobile stations UE-1 and UE-2 in the downlink/uplink and side-link is replaced with the distinction by the masking of the information INF23, not by the distinction by the mobile-station identification information (RNTI). That is, the information INF22 illustrated in FIG. 5 in the second embodiment is considered as the mobile-station identification information (for example, V-RNTI), and the information INF23 is considered as the side-link information in place of the group identification information.

The order of INF21, INF22, and INF23 illustrated in FIG. 5 is one example and may be in any desired order. In FIG. 5, although the case of masking (scrambling) the information INF20 from the least bits by the information INF23 and the information INF22 is illustrated, the information INF20 may be masked (scrambled) from the significant bits by the information INF23 and the information INF22. That is, in the field F2, the information INF23, the information INF22, and the information INF21 may be stored in the foregoing order from the significant bits, or the information INF22, the information INF23, and the information INF21 may be stored in the foregoing order from the least bits. Alternatively, the information INF20 may be masked (scrambled) from an intermediate bit by the information INF23 and the information INF22. That is, in the field F2, when the information INF21 is divided into information INF21a and information INF21b, the information INF21a, the information INF23, the information INF22, and the information INF21b may be stored in the foregoing order from the significant bits, or the information INF21a, the information INF22, the information INF23, and the information INF21*b* may be stored in the foregoing order from the least bits.

The bit length of the side-link information stored in the information INF23 can be K=2 (bits) and the side-link information can include bits b0 and b1. The bit b0 takes a value of "0" when representing the uplink (UL), and takes a value of "1" when representing the side-link (SL). The bit b1 takes a value of "0" when dynamic scheduling is performed, and takes a value of "1" when periodic scheduling is performed. In addition, the bits b0 and b1 in the side-link information may be associated with the scheduling method. For example, the bit b1 may be associated with DS (Dynamic Scheduling) and set to a value of "0" when the dynamic scheduling is performed and the bit b1 may be associated with SPS (Semi Persistent Scheduling) and set to a value of "1" when the periodic scheduling is performed. The foregoing is one example and does not exclude other scheduling methods.

Figure 9:
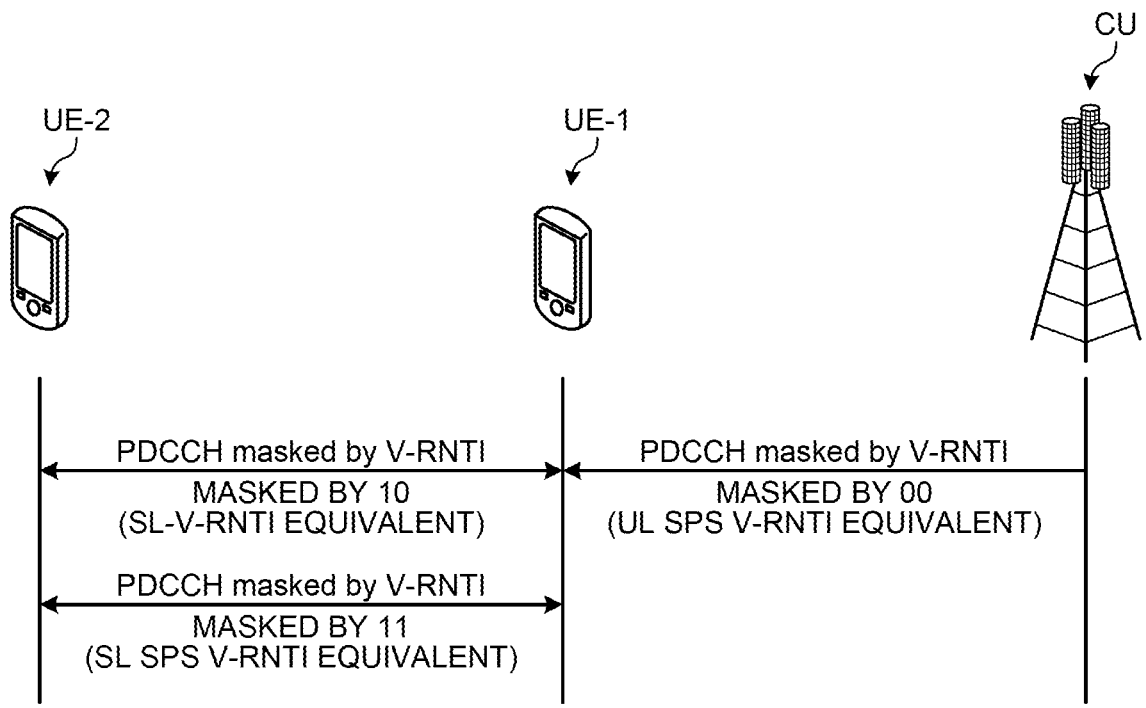
FIG. 9 is a sequence diagram illustrating operation of a communication system according to a third embodiment.

As a result, as illustrated in FIG. 9, while using one type of identification information (for example, V-RNTI), it is possible to easily identify a plurality of mobile stations UE-1 and UE-2 in the uplink/downlink and side-link.

As in the foregoing, in the first embodiment, in the control information transmitted on a certain downlink physical channel, the information INF2 is masked (scrambled) by the information INF3 and INF4 of two types. As a result, the base station CU can selectively transmit the control information to the specific mobile station UE-1 and selectively notify the specific mobile station UE-1 of the combination of the information INF4 and the other information.

For example, in the second embodiment, by making the allocation of radio resources performed not in units of mobile stations but in units of logical channel groups in which logical channels are grouped for each QoS, the use of radio resources between the base station and the mobile station can be made efficient.

Alternatively, for example, in the third embodiment, by replacing the identification of a plurality of mobile stations UE-1 and UE-2 not with the distinction by the mobile-station identification information (RNTI) but with the distinction by the masking of the information INF23, it is possible to easily identify the mobile stations UE-1 and UE-2 in the uplink/downlink and side-link while using one type of identification information.

[d] Other Embodiments

The respective constituent elements of the various units illustrated in each embodiment do not necessarily need to be physically configured as illustrated in the drawings. In other words, the specific forms of distribution or integration of the various units are not limited to those illustrated, and the whole or a part thereof can be configured by being functionally or physically distributed or integrated in any unit, depending on various types of loads and usage.

Furthermore, the first embodiment can be implemented by including and combining the second embodiment and the third embodiment. For example, the transmission of data according to QoS in the application example of the first embodiment can be mapped in the priority control of logical channels in the second embodiment. The extension of masking in the application example of the first embodiment can be mapped to the proper use of C-RNTI in the second embodiment. Moreover, the masking in the first embodiment can be mapped to the masking of the second embodiment and the masking of the third embodiment.

In addition, the various processing functions performed in the various devices may be configured such that the whole or any part thereof is executed on the CPU (Central Processing Unit) (or on a micro-computer such as an MPU (Micro Processing Unit), an MCU (Micro Controller Unit), and the like). The various processing functions may be configured such that the whole or any part thereof is executed on a program analyzed and executed by the CPU (or a micro-computer such as an MPU, an MCU, and the like), or executed on the hardware by wired logic.

The radio devices used in the first embodiment to the third embodiment (that is, base station or mobile station) can be implemented by the following hardware configuration.

Figure 10:
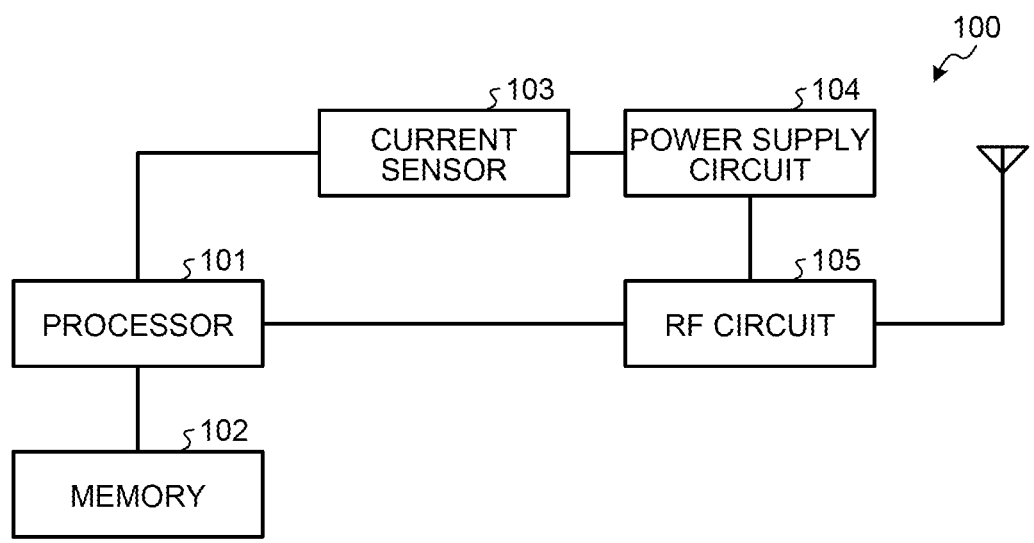
FIG. 10 is a diagram illustrating a hardware configuration of radio devices used in the first embodiment to the third embodiment.

FIG. 10 is a diagram illustrating a hardware configuration example of the radio device. As illustrated in FIG. 10, a radio device 100 includes a processor 101, a memory 102, a current sensor 103, a power supply circuit 104, and an RF circuit 105. Examples of the processor 101 include a CPU, a DSP (Digital Signal Processor), an FPGA (Field Programmable Gate Array), and the like. Examples of the memory 102 include a RAM (Random Access Memory) such as an SDRAM (Synchronous Dynamic Random Access Memory), a ROM (Read Only Memory), a flash memory, and the like.

The various processing functions performed in the radio devices of the embodiments may be implemented by executing programs stored in various memories such as non-volatile storage media by the processor. That is, the program corresponding to each processing may be recorded in the memory 102 and each computer program may be executed by the processor 101. The communication I/F can be implemented by the RF circuit 105.

According to one aspect of the radio devices disclosed in the present application, the use of the radio resources between the base station and the mobile station can be made efficient.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile station configured to transmit data to a base station by performing priority control, the mobile station comprising:
   a transmitter configured to transmit, to the base station, a plurality of pieces of data having different requirements, each logical channel group of a plurality of logical channel groups corresponding to one of the different requirements; and
   a controller circuitry configured to, when performing the priority control, apply a radio resource specified by the base station to a logical channel group specified by the base station among the logical channel groups and control, using the radio resource corresponding to each of the logical channel groups, transmission of the plurality of pieces of data in units of the logical channel groups, wherein the controller circuitry is further configured to:
apply, when the logical channel group is a first logical channel group, a first radio resource as the radio resource to the first logical channel group,
apply, when the logical channel group is a second logical channel group, a second radio resource as the radio resource to the second logical channel group, and
the first radio resource is a resource allocated only for the first logical channel group.

2. The mobile station according to claim 1, further comprising:
a receiver configured to receive first control information including resource information that specifies a first radio resource and group identification information that specifies a first channel group from the base station; and
wherein the controller circuitry is further configured to, according to the first control information, allocate the first radio resource to the first channel group and control transmission of data corresponding to the first channel group.

3. The mobile station according to claim 2, further comprising:
a receiver configured to receive from the base station after receiving the first control information, second control information including resource information that specifies a second radio resource and group identification information that specifies a second channel group; and
wherein the controller circuitry is further configured to allocate, according to the second control information, the second radio resource to the second channel group and control transmission of data corresponding to the second channel group.

4. The mobile station according to claim 1, wherein the channel groups correspond to a plurality of group identification information different from one another.

5. The mobile station according to claim 1, wherein the channel groups correspond to a plurality of service quality identifiers different from one another.

6. The mobile station according to claim 1, wherein the channel groups are set in advance for a single mobile station.

7. The mobile station according to claim 1, wherein
the first radio resource is used only for transmission of data corresponding to the first logical channel group, and
the second radio resource is used for transmission of data corresponding to the second logical channel group.

8. A base station configured to transmit data to a mobile station by performing priority control, the base station comprising:
a transmitter configured to transmit a plurality of data having different requirements corresponding to a plurality of logical channel groups; and
a controller circuitry configured to, when performing the priority control, select a logical channel group out of the logical channel groups, apply a radio resource to the selected logical channel group, and control, using the radio resource corresponding to each of the logical channel groups, transmission of the plurality of data in units of the logical channel groups, wherein
the controller circuitry is further configured to:
apply, when the logical channel group is a first logical channel group, a first radio resource as the radio resource to the first logical channel group,
apply, when the logical channel group is a second logical channel group, a second radio resource as the radio resource to the second logical channel group, and
the first radio resource is a resource allocated only for the first logical channel group.

9. A communication system comprising:
a base station; and
a mobile station configured to transmit data to the base station by performing priority control, the mobile station including:
a transmitter configured to transmit a plurality of data having different requirements, each logical channel group of a plurality of logical channel groups corresponding to one of the different requirements, and
controller circuitry configured to, when performing the priority control, apply a radio resource specified by the base station to a logical channel group specified by the base station out of the logical channel groups and control, using the radio resource corresponding to each of the logical channel groups, transmission of the plurality of data in units of the logical channel groups, wherein
the mobile station is further configured to:
apply, when the logical channel group is a first logical channel group, a first radio resource as the radio resource to the first logical channel group,
apply, when the logical channel group is a second logical channel group, a second radio resource as the radio resource to the second logical channel group, and
the first radio resource is a resource allocated only for the first logical channel group.

10. A communication system comprising:
a mobile station; and
a base station configured to transmit data to the mobile station by performing priority control, wherein the base station including:
a transmitter configured to transmit a plurality of data having different requirements, each logical channel group of a plurality of logical channel groups corresponding to one of the different requirements, and
controller circuitry configured to, when performing the priority control, select a logical channel group out of the logical channel groups, apply a radio resource to the selected logical channel group, and control, using the radio resource corresponding to each of the logical channel groups, transmission of the plurality of data in units of the logical channel groups, wherein
the mobile station is further configured to:
apply, when the logical channel group is a first logical channel group, a first radio resource as the radio resource to the first logical channel group,
apply, when the logical channel group is a second logical channel group, a second radio resource as the radio resource to the second logical channel group, and
the first radio resource is a resource allocated only for the first logical channel group.

11. A communication method performed in a communication system including a base station and a mobile station configured to transmit data to the base station by performing priority control, wherein the mobile station capable of transmitting a plurality of data having different requirements, each logical channel group of a plurality of logical channel groups corresponding to one of the different requirements, is, when performing the priority control, capable of applying a radio resource specified by the base station to a logical channel group specified by the base station out of the logical channel groups and controlling, using the radio resource corresponding to each of the logical channel groups, transmission of the plurality of data in units of the logical channel groups, wherein the mobile station is capable of applying, when the logical channel group is a first logical channel group, a first radio resource as the radio resource to the first logical channel group, applying, when the logical channel group is a second logical channel group, a second radio resource as the radio resource to the second logical channel group, and the first radio resource is a resource allocated only for the first logical channel group.

12. A communication method performed in a communication system including a mobile station and a base station configured to transmit data to the mobile station by performing priority control, wherein the base station capable of transmitting a plurality of data having different requirements, each logical channel group of a plurality of logical channel groups corresponding to one of the different requirements, is, when performing the priority control, capable of selecting a logical channel group among the logical channel groups, applying a radio resource to the selected logical channel group, and controlling, using the radio resource corresponding to each of the logical channel groups, transmission of the plurality of data in units of the logical channel groups, the base station capable of applying, when the logical channel group is a first logical channel group, a first radio resource as the radio resource to the first logical channel group, applying, when the logical channel group is a second logical channel group, a second radio resource as the radio resource to the second logical channel group, and the first radio resource is a resource allocated only for the first logical channel group.

* * * * *